United States Patent [19]

Rosenberg et al.

[11] 4,177,245

[45] Dec. 4, 1979

[54] SCALE SUPPRESSION IN LIME AND LIMESTONE SCRUBBERS

[75] Inventors: Harvey S. Rosenberg, Columbus; Henry M. Grotta, Delaware, both of Ohio

[73] Assignee: Battelle Development Corporation, Columbus, Ohio

[21] Appl. No.: 908,806

[22] Filed: May 24, 1978

[51] Int. Cl.$^2$ .................... C01B 17/00; B01D 5/00; C09K 15/00
[52] U.S. Cl. ................................. 423/242; 210/57; 252/397
[58] Field of Search .............. 423/242, 244, 235, 239, 423/512 A, 166; 210/57; 252/397

[56] References Cited

U.S. PATENT DOCUMENTS

| | | | |
|---|---|---|---|
| 1,420,477 | 6/1922 | Fairlie | 423/244 |
| 3,531,664 | 9/1970 | Hals | 423/242 R |
| 4,038,367 | 7/1977 | Atsukawa et al. | 423/235 |

OTHER PUBLICATIONS

Gralfe et al., The Development of New and/or Improved Aqueous Processes for Removing SO$_2$ from Flue Gases, vol. 2, 1970.

Primary Examiner—O. R. Vertiz
Assistant Examiner—Gregory A. Heller
Attorney, Agent, or Firm—Barry S. Bissell

[57] ABSTRACT

Suppression of calcium sulfate scale in wet lime and limestone flue gas desulfurization (FGD) scrubbers and mist eliminators is accomplished by scrubbing in the presence of an oxidation inhibitor comprising gaseous nitric oxide (NO).

7 Claims, 1 Drawing Figure

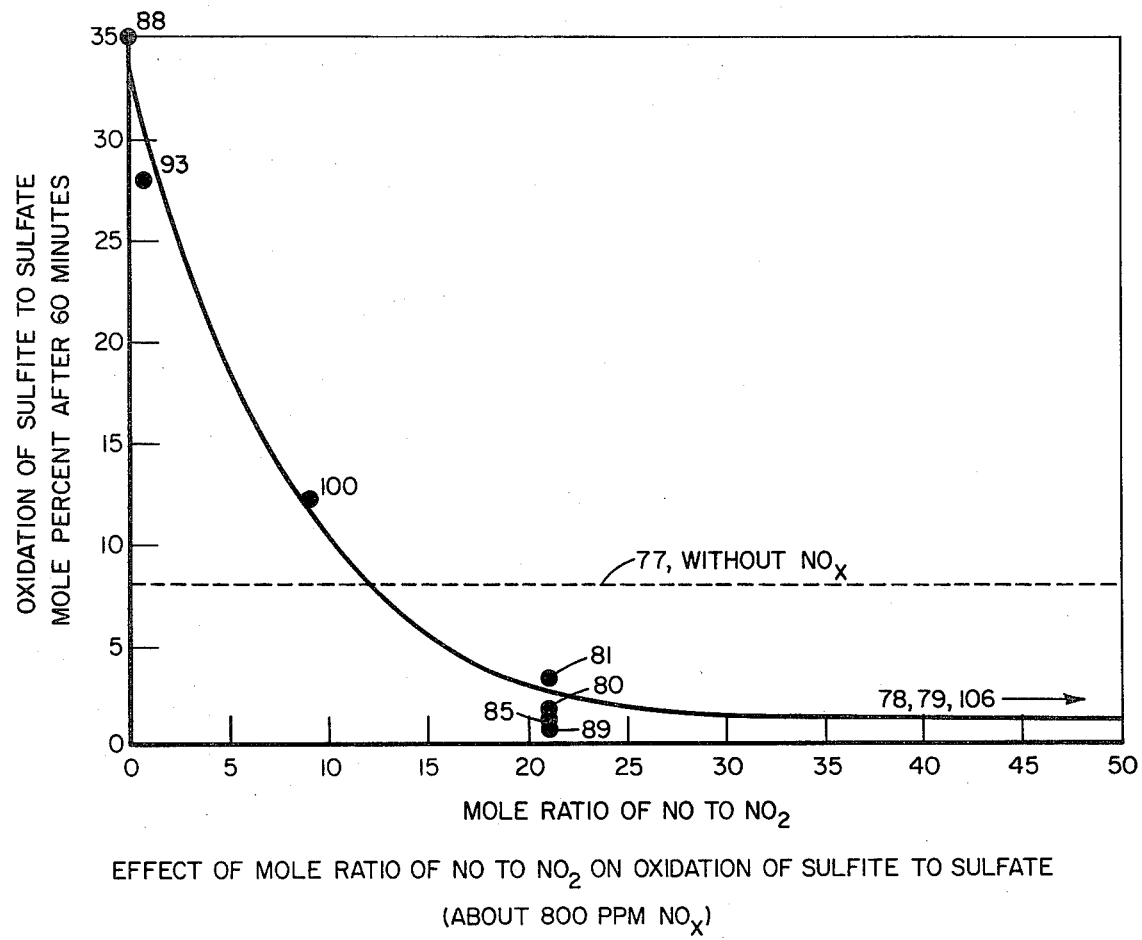
EFFECT OF MOLE RATIO OF NO TO $NO_2$ ON OXIDATION OF SULFITE TO SULFATE
(ABOUT 800 PPM $NO_x$)

SCALE SUPPRESSION IN LIME AND LIMESTONE SCRUBBERS

BACKGROUND OF THE INVENTION

Generally, the combustion of fuels containing sulfur, such as sulfur-containing coals, produces sulfur dioxide which had previously been discharged into the atmosphere. Several systems have now evolved for removing sulfur dioxide from stack gases, one of which is to pass the gases through a wet scrubbing system. Such wet scrubbing systems may use slurries of calcium carbonate, dolomite, or lime so as to cause chemical reaction with the sulfur dioxide and removal from the gases.

When calcium compounds such as lime or limestone are added as a slurry to the scrubber liquid, solid calcium salts may be formed. These salts have a limited solubility to form ions which react with the sulfur dioxide in the scrubber. Such wet calcium-containing scrubbing systems are therefore limited in efficiency by the solubility of calcium salts in the slurry. In addition, the formation of calcium sulfate in a supersaturated state in such systems creates a problem of scaling or deposition of inorganic solids in the scrubber and connected conduits which interferes with the operation of the sulfur dioxide removal system.

Many methods and additives have been used to reduce the oxidation of calcium sulfite to the scale-forming calcium sulfate in lime scrubbers. Such additives include magnesium oxide (U.S. Pat. No. 3,919,393), thiosulfate (U.S. Pat. No. 3,937,788) and hydroquinone (U.S. Pat. No. 3,485,581).

Further, U.S. Pat. No. 3,920,421 teaches the co-removal of $SO_2$ and $NO_x$ (although not in a lime scrubber) by a catalytic process wherein the sulfite ions are oxidized to sulfate and nitrogen oxides are reduced to elemental nitrogen.

A report by Graefe, et. al. (PB196781, NTIS) entitled "The Development of New and/or Improved Aqueous Processes for Removing $SO_2$ from Flue Gas", Volume II, discusses the effects of $NO_x$ on sulfite oxidation in, principally, sulfite-bisulfite scrubbers. However, the report teaches away from the present invention in that it categorizes both NO and $NO_2$ as oxidizers, although it does disclose that $NO_2$ is the more active. FIG. 6 therein shows that generally higher oxidation can be expected in a sulfite-bisulfite scrubber when NO is present (with or without $NO_2$) than if NO is not present. Graefe, et. al. also show a process for eliminating sulfate in a dry fluidized bed absorber and reducing sulfate formation to a very low value in an aqueous absorber through use of a pre-scrubber to reduce $NO_2$ by converting it to NO. The overall teaching, however, is distinguishable from the present invention which teaches that not only is NO not an oxidant but that by itself or in high enough proportion with $NO_2$, it will act to inhibit oxidation.

SUMMARY OF THE INVENTION

The present invention is a method for reducing sulfate scale formation in known lime and limestone slurry processes for flue gas desulfurization (FDG). The novel step consists of adding an oxidation inhibitor comprising nitric oxide (NO) to the flue gas prior to the $SO_2$ absorption step. If NO is already present in the flue gas along with other nitrogen dioxide, the novel method step comprises adjusting the mole ratio of NO to $NO_2$ to at least about 15:1, preferably at least 20:1. Other known oxidation inhibitors or suppressants may be used in conjunction with the NO.

DESCRIPTION OF THE INVENTION

It has been discovered that nitric oxide has an inhibitory effect on the oxidation of calcium sulfite. Former researchers have recognized only that $NO_2$ acts as a promoter, either catalytically or as a direct oxidant to convert sulfite ions to sulfates. The Figure shows the combined effects of NO and $NO_2$ on sulfite oxidation, demonstrating that NO is insufficient at equal concentrations with $NO_2$ to significantly inhibit the oxidative influence of $NO_2$; but that at a mole ratio of about 12 to 1 the promotive action of $NO_2$ is offset and the total oxidation is no greater than it would be without $NO_x$ present. Above about 20 to 1 mole ratio of NO to $NO_2$, the oxidation of sulfite appears to be essentially minimized. Data for the Figure were obtained using the equipment described in the Examples below.

The ratio of nitrogen oxide species was varied in the laboratory by using several different gas cylinders containing various compositions. In actual practice, pure NO could be added to the flue gas stream. Typically, however, flue gas may contain a mixture of nitrogen oxides; predominantly $NO_2$ and NO. For example, the flue gas from a coal-fired boiler may contain $NO_x$ comprising 90 mole percent NO and 10 mole percent $NO_2$. In these cases scale formation may be reduced by adding NO to the flue gas or by removing $NO_2$ from the flue gas or converting the $NO_2$ to NO sufficient to increase the $NO/NO_2$ ratio to greater than about 15 to 1, preferably greater than about 20 to 1 to minimize oxidation.

The inventive features may be further observed in the following Examples.

DESCRIPTION OF THE PREFERRED EMBODIMENTS

The apparatus used in the Examples was constructed to perform laboratory-scale experiments to study oxidation inhibition in lime/limestone FGD systems. Simulated flue gas was obtained by mixing gases from two cylinders, one containing 90 mole percent nitrogen and 10 mole percent oxygen and the other containing 75.5 mole percent nitrogen, 24 mole percent $CO_2$, and 0.5 mole percent $SO_2$. For experiments with $NO_x$ in the flue gas, three gas cylinders were used. One contained 66 mole percent nitrogen, 24 mole percent $CO_2$, and 10 mole percent oxygen; the second contained 0.015 to 0.15 mole percent $NO_x$ with the balance nitrogen, and the third cylinder contained $SO_2$. Several cylinders containing $NO_x$ were available so that the ratio of NO to $NO_2$ could be varied over a wide range.

The gases from the cylinders were passed through calibrated rotameters equipped with dial thermometers and pressure gauges. The rotameters were operated at 15 psig, and flow controllers were used to reduce the pressure to atmospheric conditions. The line from the cylinder containing $SO_2$ or $NO_x$ had a check valve after the flow controller to prevent backflow from the cylinder containing oxygen. After leaving the flow controller, the oxygen-containing stream passed through a preheat loop in a water bath and then through a water-bubbler humidifier, where the stream was saturated with $H_2O$. The $SO_2$ and $NO_x$-containing stream also passed through a mixing chamber which was immersed in the water bath. From the mixing chamber, the gas stream flowed to a manifold containing 3 three-way stopcocks so that the flow could be directed either to the reactor and then to the SO$_2$ and NO$_x$ analyzers or vice versa. The stopcock manifold permitted checking of the SO$_2$ and NO$_x$ content of the inlet gas to the reactor periodically during the course of a run. The SO$_2$ and NO$_x$ content of the outlet gas from the reactor was monitored continuously except for short periods when the inlet concentrations were being checked. The SO$_2$ analyzer was an International Biophysics Corporation Series NS-300 which has a fuel cell detector specific for SO$_2$. The NO$_x$ analyzer was a Beckman Model 315A infrared analyzer equipped with a thermal converter for decomposing NO$_2$ to NO. The No$_2$ content of the gas stream was determined by difference between readings with the converter on and off-line.

The reactor was also immersed in the water bath, which was maintained at 125 F., and the entire flow system, between the flow controller and the vent, was enclosed in a plastic cabinet maintained at 130 F. The initial experiments were performed with a 1,000 ml reactor, but the reactor size was subsequently decreased to 100 ml in order to reduce the time required to exhaust the scrubbing reagent.

The simulated flue gas entered the reactor through a hollow glass stirring rod and was dispersed through a small opening at the bottom of the rod. A set of three glass propeller blades was located at the bottom of the rod to insure good mixing. The gas left the reaction through a small packed bed of fiberglass screen in order to remove any entrained liquid. The reactor was equipped with a fitting for sealing in a pH electrode and a port for withdrawing samples of the scrubbing liquor. The 100 ml reactor contained a small roll of stainless steel screen which was intended to simulate structural components of an FGD unit and provide a site for scale deposition.

Semi-batch experiments were performed to determine the mole percent oxidation of sulfite to sulfate as a function of time. The scrubbing reagent consisted of a 5 percent slurry of hydrated lime and contained 100 milligrams of fly ash and 250 milligrams of CaCl$_2$. The SO$_2$ and NO$_x$ analyzer readings reactor pH were recorded continuously on stripchart recorders. Samples of scrubber slurry were withdrawn from the reactor after 10, 30, and 60 minutes and at the conclusion of a run (usually 90 minutes) and the solid phase was analyzed for sulfite and sulfate. Prior to analysis, the solid phase was separated from the liquid phase by a simple draining. Subsequent checks on the sulfite and sulfate content of the liquid phase revealed that the residual liquid in the solid sample had a negligible effect on the analytical results. Sulfite was determined by adding a measured sample to an excess of acidified iodine solution and back-titrating with a standard sodium thiosulfate solution. Sulfate was determined by acidifying a measured sample, boiling the solution to evolve SO$_2$, and precipitating BaSO$_4$ for weighing. These analytical techniques do not distinguish between sulfite and bisulfite or sulfate and bisulfate, however the level of bisulfate is expected to be rather small and related to the amount of sulfate so that its presence would not alter the conclusions drawn from the experimental results.

EXAMPLES 1-11

Ten experimental runs were made with the above apparatus using about 800 ppm No plus NO$_2$ in varying proportions. Two control runs were also made without NO$_x$ but one resulted in unreasonable results and was therefore rejected. Results of the runs are shown in Table 1. Oxidation of sulfite to sulfate was recorded after 30 minutes and 60 minutes and the latter results are plotted in the Figure vesus the mole ratio of NO to NO$_2$ in the run.

Table 1

| | Oxidation of Sulfite in Lime Scrubber Simulation | | | | |
|---|---|---|---|---|---|
| | NO$_x$ Concentration, ppm | | | Oxidation of Sulfite, m/o | |
| Run No. | NO | NO$_2$ | NO/NO$_2$ | 30 min | 60 min |
| 71 | 700 | <7 | >100 | 1.4 | 1.4 |
| 77 | 0 | 0 | — | 6.6 | 7.6 |
| 78 | 775 | <5 | >155 | 1.8 | 1.3 |
| 79 | 775 | <5 | >155 | 1.7 | 1.3 |
| 80 | 650 | 30 | 21.7 | 2.6 | 1.7 |
| 81 | 650 | 30 | 21.7 | 4.4 | 3.3 |
| 85 | 650 | 30 | 21.7 | 3.0 | 1.4 |
| 88 | 0 | 750 | 0 | 33.4 | 35.0 |
| 89 | 650 | 30 | 21.7 | 1.3 | 0.9 |
| 93 | 360 | 490 | 0.7 | 26.1 | 28.0 |
| 100 | 710 | 80 | 8.9 | 11.3 | 12.2 |
| 106 | 775 | <5 | >155 | 0.7 | 1.1 |

Looking at the Figure, it is seen that when the mole ratio of NO/NO$_2$ is about 15 the oxidation of sulfite to sulfate is less than it is without the NO$_x$ present. Therefore, inhibitory benefits are obtained from the mixture (even though NO$_2$ is present) when the ratio is greater than about 15. A relative minimum is reached according to the Figure when the mole ratio of NO/NO$_2$ is greater than about 20 and further elimination of NO$_2$ or adding of NO to the system does not appear to appreciably improve the inhibitory effects of the mixture.

The NO/NO$_2$ was controlled in the experiments by controlling the composition of the simulated flue gas. In practice, however the flue gas composition would be relatively fixed and either NO must be added to the gas or NO$_2$ must be removed such as by scrubbing or reduced to NO (as taught by Graefe, et. al. for sulfite bisulfite aqueous scrubbers) to increase the NO/NO$_2$ mole ratio to greater than about 15.

What we claim is:

1. In a method for reducing calcium sulfate scale formation in a known lime or limestone wet scrubbing process for flue gas desulfurization wherein SO$_2$-laden flue gas is exposed to the lime or limestone and the SO$_2$ is absorbed therein for removal, wherein the improvement comprises
   adding to the flue gas, prior to the absorption step, an oxidation inhibitor comprising gaseous NO.

2. The method of claim 1 wherein the oxidation inhibitor comprises NO and NO$_2$ and the mole ratio of NO to NO$_2$ is greater than about 15 to 1.

3. The method as in claim 1 for reducing scale formation wherein the flue gas contains NO and NO$_2$ which comprises adding to the flue gas enough NO such that the ratio of NO to NO$_2$ is greater than about 15 to 1.

4. In a method for reducing calcium sulfate scale formation in a known lime or limestone wet scrubber process for flue gas desulfurization wherein SO$_2$-laden flue gas also containing NO and NO$_2$ is exposed to the lime or limestone and the SO$_2$ is absorbed therein for removal, wherein the improvement comprises
   adjusting the ratio of NO to NO$_2$ in the flue gas entering the scrubber such that the ratio of NO to NO$_2$ is greater than about 15 to 1.

5. The method of claim 4 which comprises removing NO$_2$ from the flue gas prior to the SO$_2$ absorption step.

6. The method of claim 4 which comprises reducing NO$_2$ to NO in the flue gas.

7. The method as in claim 2, 3, or 4 wherein the mole ratio of No to NO$_2$ is greater than about 20 to 1.

* * * * *

UNITED STATES PATENT OFFICE
CERTIFICATE OF CORRECTION

PATENT NO. : 4,177,245
DATED : 12/4/79
INVENTOR(S) : Harvey S. Rosenberg and Henry M. Grotta It is certified that error appears in the above-identified patent and that said Letters Patent are hereby corrected as shown below:

Column 3, line 28, change "reaction" to -- reactor --.
Column 4, line 2, change "vesus" to -- versus --.

Signed and Sealed this

Twenty-fifth Day of March 1980

[SEAL]

Attest:

SIDNEY A. DIAMOND

Attesting Officer           Commissioner of Patents and Trademarks